July 31, 1962 H. S. LACE 3,046,672
LEVEL
Filed Jan. 19, 1959 2 Sheets-Sheet 1
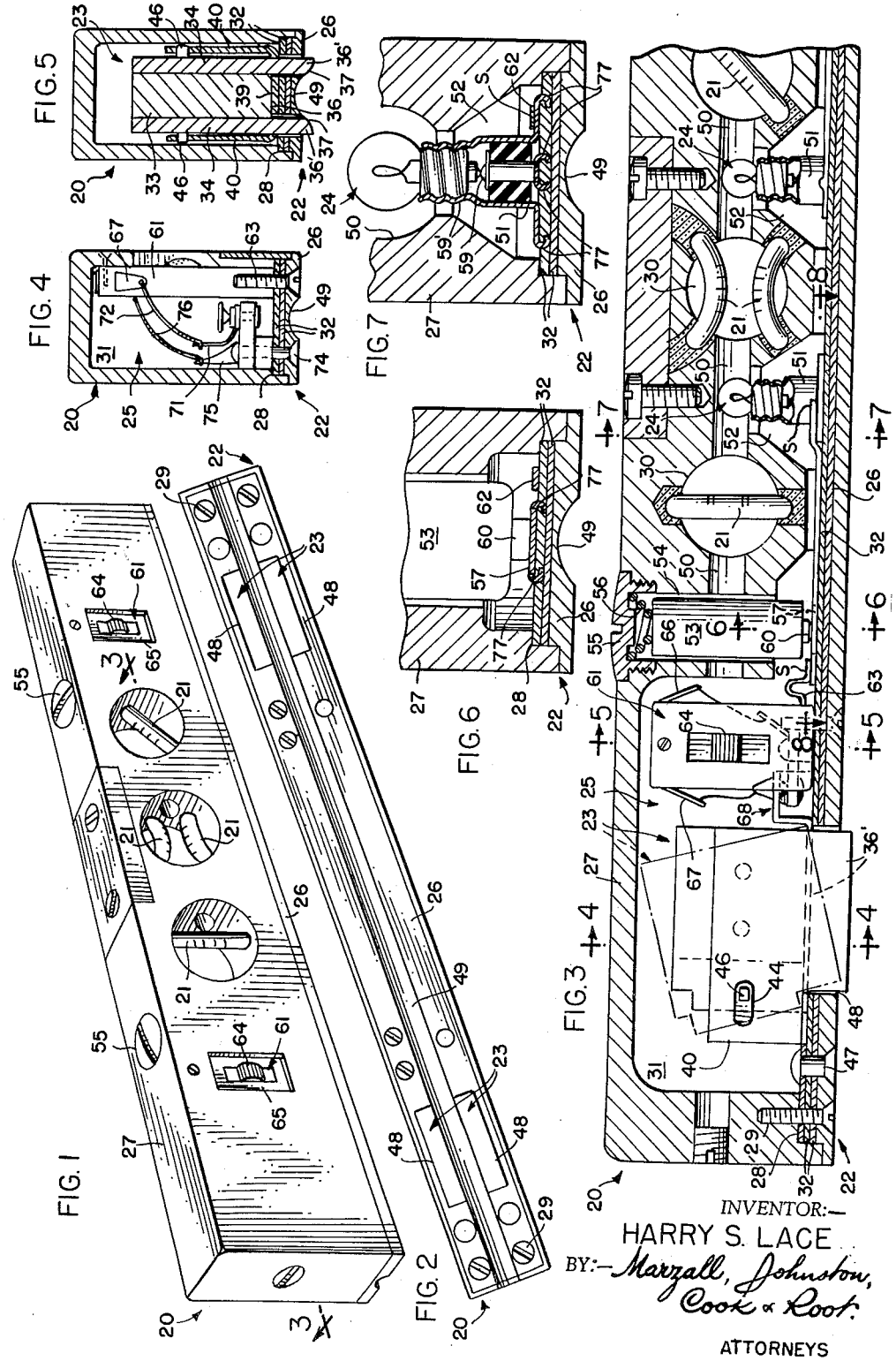
INVENTOR:—
HARRY S. LACE
BY:— Marzall, Johnston,
Cook & Root
ATTORNEYS July 31, 1962  H. S. LACE  3,046,672
LEVEL
Filed Jan. 19, 1959  2 Sheets-Sheet 2
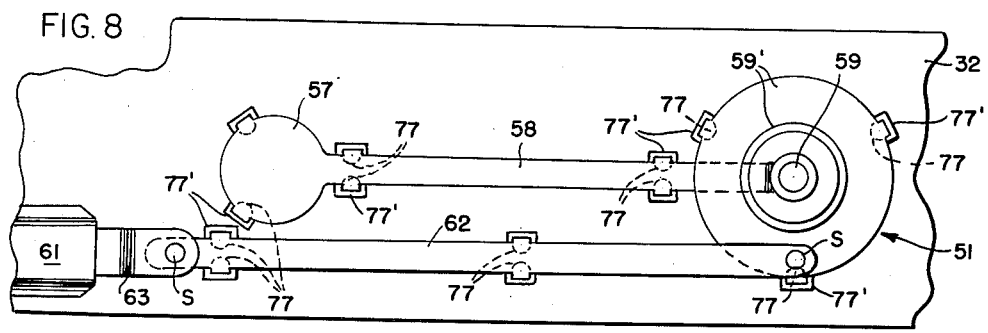
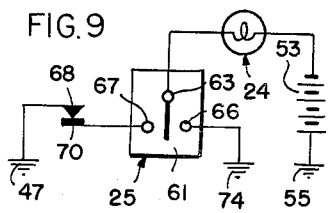
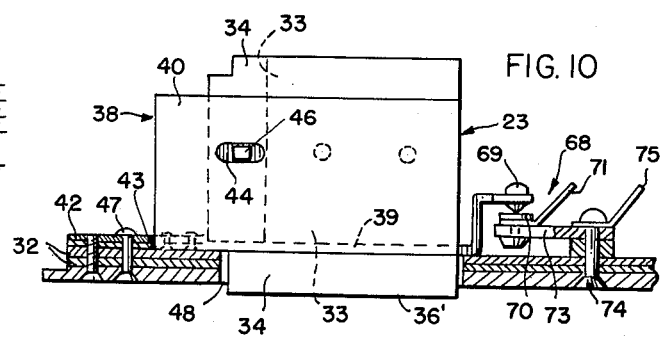
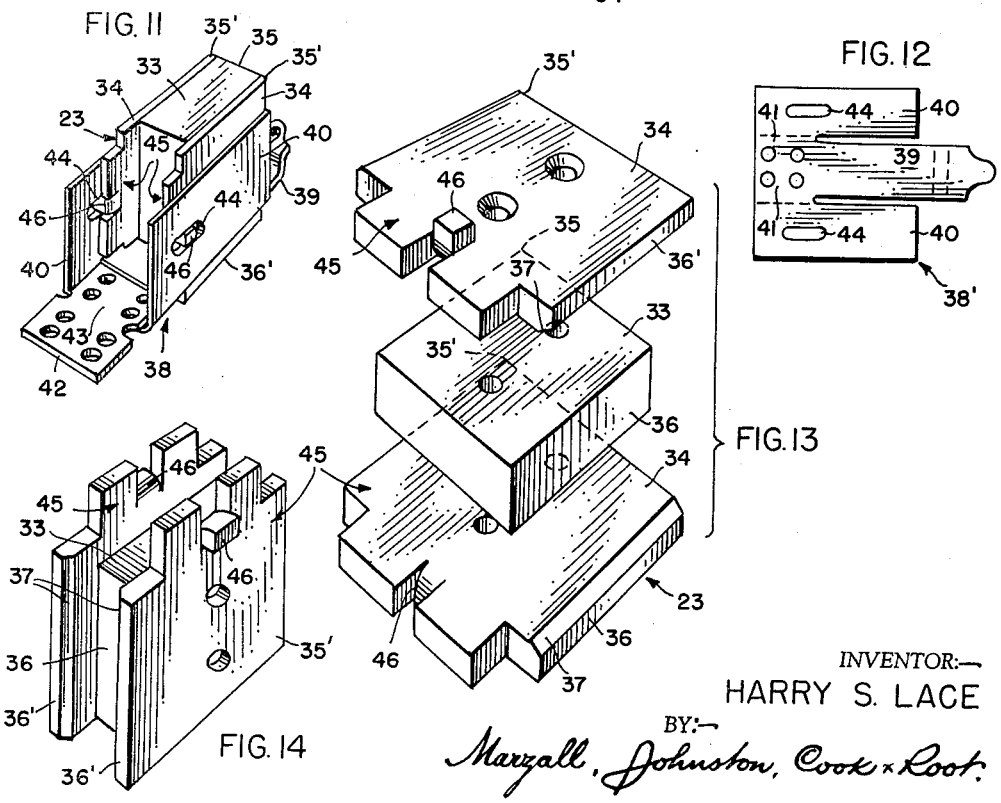
INVENTOR:—
HARRY S. LACE
BY:—
Marzall, Johnston, Cook & Root.
ATTORNEYS

United States Patent Office 3,046,672
Patented July 31, 1962

3,046,672
LEVEL
Harry S. Lace, 1441 N. Washtenau Ave., Chicago 22, Ill.
Filed Jan. 19, 1959, Ser. No. 787,434
13 Claims. (Cl. 33—207)

The present invention relates in general to levels of the sort used by electricians, plumbers and other mechanics to test and determine the horizontal, vertical or inclined condition of structural elements such as pipes, conduits, joists, beams and the like, the invention having more particular reference to an improved level embodying bubble elements for level indicating purposes.

An important object of the present invention is to provide an improved mechanics level having means operable to illuminate the indicating elements of the level and thus facilitate its use in dark places.

A still further object of the invention is to provide for the illumination of the level indicating elements in response to the application of the device in level indicating position on a structural element being tested.

Another important object of the invention is to provide means for holding a level self-supportingly in place, upon structural elements being tested, to thereby free the hands of the level user while the device is performing its level indicating function.

Another important object of the invention is to provide a level of the character mentioned having electric lamps in position to illuminate the indicating elements of the level, in conjunction with switching means automatically operable to energize the lamps as the device is applied in level indicating position upon a structural element; a further object being to provide means operable to secure the device in level indicating position on a structural element and hence to maintain the switch means in lamp energizing position so long as the device is held upon the structural element.

Another important object is to provide a level of the character mentioned embodying magnetic means for holding the level self-supportingly in level indicating position upon structural elements such as conduits, pipes, struts, beams and other elements of magnetically permeable material such as iron and steel; a further object being to provide a level device containing permanent magnets for holding the device in level indicating position on elements of magnetically permeable material; yet another object being to employ ceramic wafer magnets for the purpose.

A still further object of the invention is to mount holding magnets shiftably on the frame of a level; another object being to mount the magents in normally retracted position on the frame of the level so that they may shift thence to a projected holding position in response to the application of the device upon a structural element of magnetically permeable material; still another object being to provide electric lamps for illuminating the indicating elements of the level and normally open switch means for controlling the lamps, including means for closing the switches in response to movement of a holding magnet into projected level holding position.

Another important object is to provide an inexpensive sheet metal yoke for rockably mounting ceramic magnets in a level structure, including a resilient switch actuating element operable to energize lamps to illuminate the indicating elements of the level, as the yoke is shifted in response to magnet movement to projected position in the structure as the same as applied in level indicating position upon a member of magnetically permeable material.

The foregoing and numerous other important objects, advantages and inherent functions of the invention will become apparent as the same is more fully understood from the following description which, taken in connection with the accompanying drawings, discloses a preferred embodiment of the invention.

Referring to the drawings:

FIG. 1 is a perspective view of a level embodying the present invention;

FIG. 2 is a plan view of the bottom surface of the level;

FIG. 3 is a sectional view taken substantially along the line 3—3 in FIG. 1;

FIGS. 4, 5, 6, 7 and 8 are sectional views taken substantially along the lines 4—4, 5—5, 6—6, 7—7 and 8—8 in FIG. 3;

FIG. 9 is a diagram of electrical connections;

FIG. 10 is an enlarged view of components embodied in the assembly shown in FIG. 3;

FIG. 11 is a perspective view of a component shown in FIG. 10;

FIG. 12 is a plan view of a sheet metal element prior to being bent to form a part of the component shown in FIG. 11;

FIG. 13 is an exploded view of parts of a magnet structure embodied in the component shown in FIG. 11; and FIG. 14 is a perspective view of the magnet structure.

To illustrate the invention the drawings show a level 20 embodying a plurality of bubble elements 21 mounted in a support frame 22 in position to be viewed for level indicating purposes. Magnetic means 23 is mounted in the frame in position to hold the level self-supportingly upon any magnetically permeable member such as an iron on steel pipe, beam and/or other structural element; and the level 20 also embodies illuminating means 24 in the form of electric lamps mounted in the frame in position to illuminate the bubble elements, in response to the operation of switch means 25 mounted on the level frame and including a switch operable to actuate the lamps upon application of the level in indicating position upon a structural member.

The frame 22 may conveniently comprise a base plate 26, forming the bottom of the level, and a housing member 27 formed with chambers or recesses opening at the bottom thereof, means being provided for securing the base plate upon the housing member, in position enclosing said cavities. The bottom side of the housing member is preferably formed with a marginal seat 28 for receiving the peripheral edges of the bottom plate, means such as fastening screws 29 being provided for detachably securing the bottom plate to the housing member. The housing member may be formed with preferably circular window channels 30 extending transversely through the housing member and opening at the opposite sides thereof, the level indicating bubble elements 21 being mounted in the openings 30 in any suitable, preferred or conventional manner.

The magnetic means 23 may be mounted in any suitable or preferred position in the structure permitting said means effectively to hold the level upon a magnetically permeable object. To this end, as shown more particularly in FIG. 3 of the drawings, the magnetic means 23 may comprise a pair of magnets mounted one near each of the opposite ends of the level, said magnets being supported on the base plate 26 is position extending each in a corresponding cavity or chamber 31 formed in the housing member 27, adjacent the opposite ends thereof, the window channels 30 being formed through the medial portions of the housing member intermediate said chambers 31.

The base plate 26 and housing member 27 may be made of any suitable material, including wood or plastic. The base plate and housing member, however, preferably comprise diecastings of aluminum or other metal. The bottom plate also may carry one or more layers of insulation 32 secured thereon in position overlying the surface of the bottom plate which faces inwardly upon the housing member 27, so that the various components carried on the bottom plate 26 may either be electrically insulated therefrom by the layer or layers 32, or electrically connected therewith, as by means of studs, screws or other fastening members extending through openings in the layer or layers 32 and making electrical contact with the base plate 26. The base plate and housing member, also, may be electrically connected together by direct contact therebetween, at the peripheral edges of the base plate, and by means of the fastening screws 29, which may have heads extending in seats formed in the base plate at the opposite ends thereof and stems threadingly engaged in openings formed in the housing member. As a consequence, all components may be grounded and thereby electrically interconnected by connecting the same either with the housing member or the base plate thereby greatly simplifying electrical connections and minimizing the cost of assembling the device.

While any suitable magnet means may be employed for holding the level upon a magnetically permeable support, the present invention more particularly contemplates magnet means supported in the structure of the level in relatively shiftable fashion, such means being preferably held in normally retracted position and being movable to projected level holding position when the device is applied upon a magnetically permeable support. To this end, the magnet means is preferably mounted for pivoted movement on the base plate 26.

As shown, the magnet means 23 may comprise a wafer 33 of ceramic material, such as alkaline earth magnetic ferrite having extremely high magnetic coercive force, the wafer preferably comprising a thin rectangular block of material having oppositely facing pole forming surfaces of substantial area and square shape. The magnetic wafer 33 may be and preferably is disposed between a pair of plates 34 forming pole pieces, the same comprising steel or other magnetically permeable metal. The plates 34 may be of generally rectangular configuration and of area slightly larger than that of the pole forming surfaces of the wafer 33. The plates 34 and the wafer 33 may be secured tightly together, as by means of rivets extending in alined openings formed in the wafer and plates, to thereby form a magnetic sandwich, with the wafer extending between the plates, one corner of the wafer and the sides thereof which define said corner extending in alinement with corresponding corners of the plates 34 and the sides thereof which define said corners. The plates 34 have registering edge portions 35 projecting outwardly of one side 36 of the wafer 33, said edge portions being bevelled to form mutually facing inclined surfaces 37 disposed outwardly of the side 36 of the wafer.

Any suitable or preferred means may be provided for mounting the magnetic sandwich 23 in the level structure. As shown, a bracket 38 of the sort shown in FIG. 12 may be employed for mounting the magnetic means 23 upon the base plate 26, said bracket comprising a piece of sheet metal 38' embodying a central strip portion 39 and side portions 40 each integrally connected at one end thereof with the strip portion by means of a narrow connecting portion 41, whereby said side portions 40 may be bent at right angles with respect to the strip portion at said connecting portions 41. The bracket may also include a separate mounting portion 42 of flexible material in alinement with and joined to the strip portion 39 by means of rivets, said portion forming an interconnecting neck 43 serving as a hinge to rockably support the bracket and the magnetic sandwich 23 on the base plate 26. The side portions of the bracket are disposed in parallel spaced apart relation upwardly and on opposite sides of the strip portion 39; and said portions 40, opposite the connecting portions 41, may be formed with elongated slots or openings 44. The magnetic sandwich 23 may be mounted in the bracket with the side 36 of the wafer 33 resting upon the strip portion 39 of the bracket, the edge portions 36' of the plates 34 extending downwardly of the strip portion 39 of the bracket on opposite sides thereof.

The plates 34 of the magnetic sandwich have edge portions 45 extending between the side members 40 of the bracket opposite the elongated openings 44, said edge portions 45 being formed with outwardly bent fingers 46 extending in said openings to secure the magnetic sandwich 23 in the bracket. The bracket 38 may be mounted on the base plate 26 by means of rivets 47 extending in openings 47' in the mounting portion 42 of the bracket, said rivets serving to electrically connect the bracket with the base plate 26 through the insulating layer or layers 32, and also to secure said layer or layers firmly upon the base plate. The base plate and insulating layer or layers may be formed with slots 48 for receiving the edge portions 36' of the pole pieces 34. Each bracket 38 forms yielding means normally supporting its corresponding magnetic sandwich 23 in retracted position, within the chamber 31, as shown in dotted lines in FIG. 3 of the drawings. When in such a position, the bevelled edge portions 36' of the pole pieces 34 are in position retracted inwardly of the base plate 26. When, however, the level device is applied upon a magnetically permeable member such as an iron pipe or a steel beam, the magnetic sandwich will be drawn downwardly in the housing 27 into position presenting the bevelled edge portions 36' of the pole pieces outwardly of the bottom plate 26 and in position magnetically adhered to the support member, thereby holding the level device thereon.

In order to facilitate the application of the level device to support members of elongated pipe-like character, the base plate 26 may be formed longitudinally with a medial inwardly curved preferably cylindrical groove 49 extending medially between the openings 48 which accommodate the bevelled edges 36' of the magnetic pole pieces 34. It will be noted that the inclined or bevelled surfaces 37 of said pole pieces extend in position substantially tangential with respect to the cylindrical curvature of the medial groove 49, when the magnetic sandwich is in projected position as shown more particularly in FIG. 5 of the drawings.

The present invention also contemplates the provision of means for illuminating the level indicators 21 at will as well as whenever the level device is applied in indicating position upon a structure to be tested. To this end, the housing 27 may be provided with lamp receiving chambers preferably comprising ducts or channels 50 in which the lamps 24 are supported, said ducts 50 opening upon the transverse chambers 30 in which the indicating elements 21 are mounted. The lamps 24 are preferably supported in suitable socket forming members 51 secured on the insulating layer 32 and hence electrically insulated from the base plate 26, the socket members 51 providing conventional center stud and threaded shell lamp contact elements, through which lamps mounted therein may be energized. The lamps 24 may thus be supported on the base plate 26 in position extending within the ducts 50, when the base plate is in mounted position upon the housing member 27, said housing member being formed with cavities 52 for receiving the lamps and the associated lamp supporting socket members 51, said cavities opening at the bottom of the housing member and into the ducts 50.

In order to operate the lamps 24, the same may be energized, under the control of the switch means 25, from an electrical power source or sources mounted on the frame 22. As indicated in FIGURES 1 and 3 of the drawings, a separate power source in the form of a conventional dry battery 53 may be provided for each lamp 24, although it will be obvious, if desired, that a single power source may be provided to energize all of the lamps. As shown, each of the batteries 53 may be housed in a corresponding cavity or channel 54 formed in the housing member 27 and opening, at one end, at the top of the housing member 27, said end being normally closed, as by means of a removable screw cover 55 fitted with an internal spring 56. The opposite end of the channel 54 may open at the bottom of the housing member 27 in position facing the upper surface of the base plate 26 when the same is in mounted position on the housing member. A battery contact 57 may be mounted on the insulating layer or layers 32 of the base plate in alinement with the channel 54 in position to make electrical contact with a terminal of the battery 53, when the same is mounted in the channel 54. The battery contact 57 may be electrically connected with the center lamp contact of the lamp base 51, by means of a conductor strip 58, supported on an insulating layer 32 of the base plate, said strip extending between and being electrically interconnected with the battery contact 57 and the center lamp contact 59 of the lamp support 51.

The battery 53 may be and preferably is of the type having a center post 60 at one end in position to engage and make contact with the battery contact 57, when the battery is assembled in mounted position in the channel 54. The battery may be mounted in operative position in the channel 54 by removing the screw cover 55 and inserting the battery endwise into the channel. After loading the battery into the channel 54, the cover 55 may be replaced in position making electrical contact with the bottom of the battery, through the spring 56, so that one side of the battery 53 will be connected electrically with and thus grounded on the housing member 27, its other side being electrically connected with the center contact of the lamp. The lamp energizing circuit may be completed from the threaded shell lamp contact 59' of the lamp base 51, through the switching means 25 to the housing member 27 and hence to the side of the battery which is connected with the housing member through the cover cap 55 and spring 56.

The switching means 25 may comprise a single pole, three position manually operable switch 61 having a movable pole or blade electrically connected with the lamp socket contact 59' by means of a connection strip 62 mounted on the insulation layer 32 of the base plate, the opposite ends of said strip being soldered, as at S, and hence electrically connected with the lamp socket contact 59' and with a pole connected terminal 63 of the manually operable switch. The manually operable switch 61 may comprise a frame of insulating material secured on the base plate in position with the manually operable pole actuating member 64 of the switch exposed through a lateral opening 65 formed in the side of the housing member 27. The member 64 is preferably adjustable in opposite directions from a medial "switch off" position into engagement with either of two contact elements 66 and 67. Means is provided for electrically connecting the contacts 66 and 67 with the ground side of the battery 53 either directly or through a normally open switch 68 adapted to close in response to the application of the level in indicating position on a support structure.

The switch 68 may comprise a movable contact 69 mounted on the magnet carrying portion 39 of the bracket 38 and hence electrically connected with the base plate 26 by means of the fastening rivet 47, the contact element 69 being thus electrically connected with the housing member 27 by virtue of the electrical connection of the base plate 26 with the housing member through the fastening screws 29. The switch 68 also comprises a stationary contact 70 supported in position to make engagement with the movable contact 69 as the result of movement of the magnetic sandwich 23 in the bracket 38 when the level is applied in level indicating position. The switch element 70 may conveniently comprise a stud of electrical conducting material adapted for electrical connection with the terminal 67 of the manually operable switch as through a soldering lug 71 and a conductor wire 72, the stud 70 and soldering lug 71 being preferably supported on a bar of insulating material 73 which in turn may be held upon the base plate as by means of a rivet 74. The rivet 74 may also serve to hold the layer or layers 32 firmly on the base plate 26, and to electrically connect a soldering lug 75 with the base plate, a conductor 76 being electrically connected between the lug 75 and the terminal 66 of the manually operable switch.

It will be seen from the foregoing that the lamp 24 may be energized from the power source 53 by moving the pole of the switch 61 into engagement with the switch contact 66, thereby completing a lamp energizing circuit from the housing member 27 through the battery 53 and its pole 60 to the battery contact 57, thence through the conductor strip 58 to and through the lamp 24, thence from the lamp socket 51 through the conductor strip 62 to the pole of the switch 61, and thence through the conductor 76, the lug 75 and rivet 74 to the base plate 26 and through the fastening screws 29 to the housing member 27.

The manual switch 61 may also be operated to engage its pole with the contact 67 in order to energize the lamp 24 in response to closure of the switch 68 when the level is applied in indicating position upon a support member, the lamp energizing circuit, in such case, being completed through the pole of the manually operable switch and the switch contact 67, through the conductor 72 and the soldering lug 71 to the closed contacts of the switch 68, thence through the bracket portions 39 and 43, the rivet 47 in electrical contact with the base plate 26 and thence through the fastening screws 29 to the housing member 27. The magnet carrying bracket 38 thus forms shiftable switch actuating means for closing the switch 68 by magnetic action when the level is applied on an external support of magnetically permeable material.

In order to facilitate assembly of the lamp holding socket devices 51, the battery contacts 57 and the connection strips 58 and 62 on the base plate, a pair of layers of insulation 32 may be disposed in stacked relation on the base plate. The socket devices, battery contacts and connection strips may be secured on the uppermost of the stacked layers in any suitable or preferred fashion, as by means of rivets or other fastening means. The socket devices, battery contacts and connection strips, however, may be formed with integral lugs 77 adapted to extend through openings in the uppermost layer of insulation and to be bent over upon the underside of said uppermost layer, said fastening lugs being insulated from the base plate by the other of the layers 32.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A level comprising a frame, a level indicating element mounted in readily visible position on said frame, an electric lamp on the frame in position to illuminate the indicating element, a switch operable to energize the lamp, shiftable switch actuating means on said frame and movable to operate the lamp, and magnet means normally supported in retracted position and connected with said actuating means, said magnet means having a pole portion movable to projected position for engagement with an external support of magnetically permeable material, to hold the level thereon, and to move the switch actuating means to close the switch.

2. A level comprising a frame, a level indicating element mounted in readily visible position on said frame, an electric lamp mounted on the frame in position to illuminate said element, said frame being formed to removably support an electric power source thereon, switch means operable to electrically connect a so supported power source with said lamp to energize the same, and shiftable switch actuating means comprising a magnet movable by magnetic action from a normally retracted position on the frame into position closing the switch, in response to the application of the level in indicating position on a support of magnetically permeable material, said frame comprising a chambered housing member formed with a cavity and a base plate detachably secured on the housing member in position closing said cavity, said lamp, switch means and switch actuating means being supported on said base plate in position enclosed by said chambered housing member when the plate is mounted on the housing.

3. A level comprising a frame, a level indicating element mounted in readily visible position on said frame, an electric lamp mounted on the frame in position to illuminate said element, said frame being formed to removably support an electric power source thereon, switch means operable to electrically connect as so supported source with said lamp to energize the same, shiftable switch actuating means movable to close the switch in response to the application of the level in indicating position on a support, said frame comprising a housing member and a base plate member detachably secured on the housing member, one of said members being formed with an open ended channel, for removably receiving and supporting the electric power source, one end of said channel opening upon a facing portion of the other member, a removable cover normally closing the opposite end of said channel and forming means for electrically connecting one side of the power source with the member in which the channel is formed, conductor means supported on the said other member of electrically connecting said power source with said switch means, including a power source contact on said facing portion of said other member opposite said channel in position to form an electrical connection with a power source therein.

4. A level comprising a frame, a level indicating element mounted in readily visible position on said frame, an electric lamp mounted on the frame in the position to illuminate said element, said frame being formed to removably support an electric power source, thereon, switch means operable to electrically connect a so supported power source with said lamp to energize the same, and shiftable switch actuating means comprising a magnet movable by magnetic action from a normally retracted position on the frame into position closing the switch, in response to the application of the level in indicating position on a support of magnetically permeable material, said frame comprising a housing and a base plate detachably secured on the housing and embodying insulating material, a support and connection socket for said lamp mounted on said base plate together with said switch means and said switch actuating means, and conductor means on said base plate electrically interconnecting said switch means with said lamp socket, said housing and base plate forming means electrically interconnecting the power source with said switch means and lamp socket when said base plate is secured on the housing.

5. A level comprising a frame, a level indicating element mounted in readily visible position on said frame, said frame being formed with an internal chamber, magnet means embodying a permanent magnet element shiftably mounted on said frame in position normally retracted within said chamber and having portions movable into position outwardly of said frame to engage an external support of magnetically permeable material and hold the level thereon when applied thereto.

6. A level comprising a chambered housing member and a removable base plate member forming a frame, a level indicating element mounted in readily visible position on said frame, said housing member having a cavity forming a chamber in said frame closed by said base plate member when mounted on the housing member, magnet means embodying a permanent magnet element mounted on said base plate member in normally retracted position enclosed within said chambered housing, said magnet means having a pole portion movable to projected position in an opening in said base plate member in position to engage an external support of magnetically permeable material and thereby hold the level thereon.

7. A level comprising a frame, a level indicating element mounted in readily visible position on the frame, said frame being formed with an internal chamber, magnet means shiftably mounted on said frame and normally supported in retracted position in the chamber, said magnet means having a pole portion movable into position outwardly of the frame to engage an external support of magnetically permeable material and hold the level thereon when applied thereto.

8. A level comprising a frame, a level indicating element mounted in readily visible position on the frame, said frame being formed with an internal chamber, magnet means mounted on said frame in the chamber and having a pole portion in position to engage an external support of magnetically permeable material and hold the level thereon, and resilient means supporting the magnet means on the frame in normally retracted position within the chamber, whereby, when the level is applied upon an external support of magnetically permeable material, said magnet means will be drawn from retracted position within the chamber to present the pole portion thereof in position to engage the external support.

9. A level comprising a frame, a level indicating element mounted in readily visible position on the frame, said frame being formed with an internal chamber, magnet means mounted on said frame in the chamber and having a pole portion in position to engage an external support of magnetically permeable material and hold the level thereon, said frame comprising a housing member forming the chamber, and a removable base plate member secured on the housing member in position enclosing the chamber, said base plate member being formed with an opening, bracket means embodying a resilient spring for supporting the magnet means on the base plate and within the chamber opposite said opening, the pole portion of said magnet means extending in said opening in position to engage said external support outwardly of the base plate when the level is applied on the support.

10. A level comprising a frame, a level indicating element mounted in readily visible position on the frame, said frame being formed with an internal chamber, magnet means mounted on said frame in the chamber and having a pole portion in position to engage an external support of magnetically permeable material and hold the level thereon, electric lamp mounted in position on the frame to illuminate the indicating element, and means mounted on said frame and including a normally open switch closable in response to movement of the magnet means on the frame whereby to energize the lamp in response to the application of the level in indicating position on the external support of magnetically permeable material.

11. A level comprising a frame, a level indicating element mounted in readily visible position on the frame, said frame being formed with an internal chamber, and magnet means embodying a permanent magnet element shiftably mounted on said frame and normally supported in retracted position in said chamber, said magnet means having a pole portion movable into position outwardly of the frame to engage an external support of magnetically permeable material and hold the level thereon when applied thereto, said magnet means comprising a thin wafer of magnetic material forming opposite poles at the oppositely facing surfaces thereof and sandwiched between a pair of metal face plates of permeable material overlying said oppositely facing surfaces of said wafer and having edges comprising pole portions projecting outwardly of an edge of said wafer.

12. A level comprising a frame, a level indicating element mounted in readily visible position on the frame, said frame being formed with an internal chamber, magnet means shiftably mounted on said frame and normally supported in retracted position in the chamber, said magnet means having a pole portion movable into position to engage an external support of magnetically permeable material to thereby hold the level thereon, and a bracket for shiftably supporting the magnet means on the frame, the magnet means being loosely secured for limited adjusting movement on the bracket to permit self-alinement of the magnet means with respect to the external support when in projected position engaging the same.

13. A level comprising a frame, a level indicating element mounted in readily visible position on the frame, said frame being formed with an internal chamber, magnet means shiftably mounted on said frame and normally supported in retracted position in the chamber, said magnet means having a pole portion movable into position to engage an external support of magnetically permeable material to thereby hold the level thereon, a bracket for shiftably supporting the magnet means on the frame, an electric lamp for illuminating the level indicating element, and a normally open switch controllingly connected with said bracket for energizing the lamp when the magnet means is in projected, support engaging position.

References Cited in the file of this patent

UNITED STATES PATENTS

| | | |
|---|---|---|
| 1,529,475 | Ford et al. | Mar. 10, 1925 |
| 2,553,668 | Morello | May 22, 1951 |
| 2,673,626 | Bastin | Mar. 30, 1954 |
| 2,695,949 | Ashwill | Nov. 30, 1954 |
| 2,790,069 | Alexander | Apr. 23, 1957 |
| 2,806,133 | Aube | Sept. 10, 1957 |
| 2,875,324 | Camp et al. | Feb. 24, 1959 |
| 2,922,874 | DeClerk et al. | Jan. 26, 1960 |